May 30, 1967  J. G. COPLAND  3,322,242
ELECTROMAGNETIC BRAKE
Filed Feb. 9, 1965
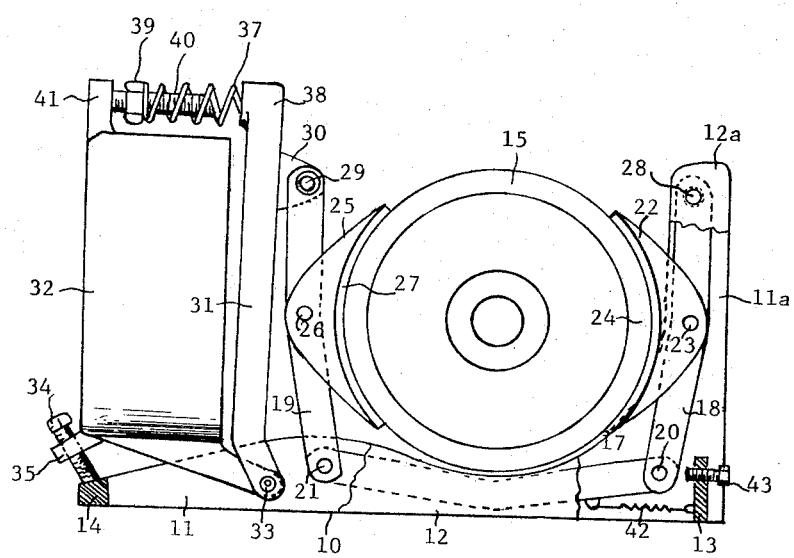
INVENTOR.
JAMES G. COPLAND
BY
J T Comfort 3,322,242
ELECTROMAGNETIC BRAKE
James G. Copland, Roanoke, Va., assignor to General
Electric Company, a corporation of New York
Filed Feb. 9, 1965, Ser. No. 431,356
2 Claims. (Cl. 188—171)

This invention is directed to a brake, and more particularly to a two-shoe electromagnetic brake having an operating linkage for enabling both shoes to be jointly spring applied to the brake drum and then electromagnetically released.

Such electromagnetic brakes are widely used in various industrial applications for repeatedly slowing down, stopping, and holding static electric motor-driven equipment, as for example, in steel mill drives, cranes, hoists, conveyors, and in marine or other similar service. These brakes are often used in such applications to control the stopping and starting of direct current motors. In such use the shaft of the motor is normally coupled to the brake drum; and as current is applied to the armature of the direct current motor, current is also applied to the magnetizing winding of the operating electromagnet to attract the armature, retracting the brake shoes from the brake drum, allowing the motor shaft to rotate. When the current to the direct current motor is interrupted, the current to the magnetizing winding of the operating electro magnet is also interrupted so that the armature drops out and the brake shoes coact with the brake drum to stop the motor shaft of the direct current motor. The armature of the direct current motor is normally in series with the magnetizing winding of the operating electromagnet to operate in the manner described above.

The armature of the operating electromagnet should pick up as soon as possible after current has been applied to the armature of the motor so that the motor does not overheat. Normally the armature of the operating electromagnet should pick up before the current reaches 40% of the rated motor current load. Previously when the electromagnetic brakes were fabricated from flame-cut steel broiler plate sections welded together, it has been difficult to construct an electromagnetic brake which would pick up before the current reaches 40% of the rated motor current load.

It is therefore an object of this invention to provide a new and improved electromagnetic brake which will pick up before the current reaches 40% of the rated motor current load.

It is also important that the armature drops out when current to the motor is interrupted so that the motor shaft is stopped as soon as possible. It is therefore another object of this invention to provide a new and improved electromagnetic brake which will drop out as soon as possible.

According to this invention, therefore, it was found that the structural supporting members of the electromagnetic brake could be constructed of ferritic ductile iron castings with less than 10% pearlite structure. With the structural supporting members fabricated from ferritic ductile iron castings with less than 10% pearlite structure the brake picked up at less than 40% of rated motor current consistently, and the drop-out time was less than half of the drop-out time of an identical brake fabricated from flame-cut boiler plate sections welded together. This marked improvement was completely unexpected as the magnetization curves indicated that the magnetization of ductile iron was much lower than that of steel.

The invention is set forth with particularity in the appended claims. The principles and characteristics of the invention, as well as other objects and advantages are revealed and discussed through the medium of the illustrative embodiments appearing in the specification and drawing which follow.

Referring to the drawing for a description of a typical two-shoe brake, the brake is shown with part of the mechanism broken away to illustrate the operation of the brake. Such brakes are also shown in U.S. Patents 2,830,682; 2,889,014 and 3,106,265; all assigned to the assignee of the present invention.

Referring now to the drawing, the two-shoe electromagnetic brake construction shown by way of illustration comprises a base 10 formed of spaced-apart metal pieces 11 and 12 that are joined together by the cross spacers 13 and 14.

For the sake of clarity in the drawing, practically all of the nearer side plate 12 has been broken away in order to more clearly reveal the details of the brake operating linkage that is nested in protective cooperating relation between the spaced-apart plates 11 and 12. As shown, the base plate 11 is provided with a projecting upright arm portion 11a extending at right angles thereto. Plate 12 is of duplicate construction. This enables the arms 11a and 12a to serve as an auxiliary mounting base so as to permit the mounting of the electromagnetic brake directly thereon in case it should be desired to conserve floor space.

The inside edges of the base plates 11 and 12 preferably are curved as shown to permit horizontal axial movement of the brake drum 15 into and out of its normal operating position in the space between the two base plates 11 and 12.

The improved two-shoe brake operating linkage of the present invention includes a tension member 17 that extends subjacent the brake drum 14 so as to nest in the space between the base plates 11 and 12. This tension member 17 has the torque yokes 18 and 19 pivotally connected at the opposite ends thereof by means of the pivot pins 20 and 21 and projecting upwardly therefrom so as to straddle only one side of the brake drum 15 and provide an open space on the opposite side for the radial removal of the drum. The brake shoe 22 is mounted on the torque yoke 18 intermediate its ends by means of the pivot pin 23 so that the brake lining 24 carried by shoe 22 will frictionally engage one side of the brake drum 15. The opposite brake shoe 25 is mounted on the torque yoke 19 intermediate its ends by means of the pivot pin 26 so that the lining 27 carried by shoe 25 will frictionally engage with the opposite side of the brake drum 15.

The upper end of the torque yorke 18 is pivotally supported on the pin 28 fixed between the upper ends of the spaced-apart upright arms 11a and 12a extending from the fixed supporting base 10 so as to nest yoke 18 therebetween.

The upper end of the torque yoke 19 is pivotally supported by means of the movable pin 29 carried by the clevis lugs 30 formed on the movable armature 31 of the operating electromagnet 32. In the form shown both the armature 31 and the operating electromagnet 32 itself are pivotally mounted on the pin 33 that extends between the spaced-apart plates 11 and 12 forming the base 10. Thus, the angular position of the operating electromagnet 32 relative to the base 10 can be easily and quickly varied by means of the adjusting screw 34 that is threaded into the lug 35 extending from the magnet so as to engage the end of the screw 34 with the cross support 14 of the base 10.

A variable force for applying the brake shoes 22 and 25 is supplied by the compression spring 37. This spring has one end seated in a socket 38 formed at the upper end of the pivoted armature 31. The other end of spring 37 engages the nut 39 threaded on the stud 40 carried by the lug 41 extending from the upper side of the pivoted operating electromagnet 32. Thus adjustment of the nut 39 enables the degree of compression of spring 37 to be varied with a corresponding variation in the retarding torque produced by the brake.

In operation whenever the magnetizing winding (not shown) of the operating electromagnet 32 is de-energized, the force of compression spring 37 is released to rotate the armature 31 away from the operating electromagnet 32 and thereby carry the movable pin 29 and the upper end of the torque yoke 19 to the right or in a clockwise direction, and thereby engage brake shoe 25 with the brake drum 15. Thereupon the torque yoke 19 pivots clockwise on the brake shoe pivot pin 26 to produce tension in the member 17. This necessarily causes endwise movement of the tension member 17 below and tangentially to the drum 15 to move the lower end of torque yoke 18 to the left or in a clockwise direction about its fixed supporting pivot pin 28 so as to engage the brake shoe 22 with the opposite side of the brake drum 15. In this way the drum 15 is clamped between the shoes 22 and 25 upon relative movement of the operating elements 31 and 11a produced by spring 37. The resulting torque reaction of the torque yoke 18 is transmitted by pin 28 and the upright fixed torque resisting arms 11a and 12a to the base 10 while the torque reaction on the torque yoke 19 is transmitted through pin 29 and the armature 31 and pivot pin 33 to the base 10 that is fixedly mounted adjacent one side of the drum 15.

Such torque resisting action of the two-shoe brake operating linkage just described is due to the fact that the fixed upright arms 11a and 12a of the base plate and the relatively movable pivoted armature 31 project in spaced-apart relation from the base 10 so as to straddle the same side of the brake drum 15 as the torque yoke arms 18 and 19 that project from the ends of the tension member 17 to be suspended by the pins 28 and 29 in double straddling relation with the same side of the brake drum 15 and thus cooperate in jointly providing the open space on the opposite side for the radial removal of the drum.

When the magnetizing winding (not shown) of operating electromagnet 32 is energized, the armature 31 is attracted to compress spring 37 and move the upper end of torque yoke 19 to the left and thereby carry brake shoe 25 out of engagement with the brake drum 15. This immediately relieves the tension in member 17 so that the light biasing spring 42 can move the tension member 17 endwise to the right tangentially to the brake drum 15 and thereby rotate the lower end of torque yoke 18 to the right or in a counterclockwise direction about its fixed pivotal mounting pin 28 and thereby carry the brake shoe 22 out of engagement with the brake drum 15. The adjustable stop screw 43 carried by the frame cross brace 13 limits such releasing movement of the brake shoe 22.

When both brake shoes 22 and 25 are released in the manner just described or preferably by mechanically compressing and suitably locking spring 37, the brake drum 15 can then be lifted bodily upwardly, if desired, for inspection, repair, or replacement service. Both brake shoes 22 and 25 can rotate on their pivotal mounting on the torque yokes to permit such free upward removal of the brake drum 15 from the open side of the improved two-shoe brake operating linkage. In this way the double straddling on the same side of the brake drum 15 of the fixed upright arms 11a and 12a and the relatively movable upright armature 31 projecting from the base 10 and of the torque yokes 18 and 19 projecting upwardly from the ends of the tension member 17 enables quick and easy removal of the brake drum 15 and also the brake shoes 22 and 25 from the open side of the brake mechanism.

As either or both of the brake shoe linings 24 or 27 wear, as will inevitably occur in heavy duty industrial service, the air gap between armature 31 and the operating electromagnet 32 will progressively increase. But with the improved operating linkage it is a relatively simple matter to adjust the screw 34 so as to return the air gap of the operating electromagnet 32 to the normal or desired value. Thus one simple adjustment serves to compensate for the wear of the linings of either or both brake shoes as well as for wear of the brake drum 15 or wear of all of the pivot bearings 20, 21, 28, 29 and 33 involved in the operating linkage.

The two-shoe electromagnetic brakes described herein are often used to control the stopping and starting of DC motors. In such use the shaft of the motor is coupled to the brake drum 15. As current is applied to the armature of the DC motor, current is also applied to the magnetizing winding of the operating electromagnet 32 to attract the armature 31, retracting the brake shoes 22 and 25 from the brake drum 15, allowing the motor shaft to rotate. When the current to the DC motor is interrupted, the current to the magnetizing winding of the operating electromagnet 32 is also interrupted so that the armature 31 drops out and the brake shoes 22 and 25 coact with the brake drum 15 to stop the motor shaft of the DC motor. To operate in the manner described, the armature of the DC motor is normally in series with the magnetizing winding of the operating electromagnet 32.

The armature 31 should be picked up as soon as possible so that the motor does not overheat. The normally accepted requirement is that the armature should pick up before the current reaches 40% of the rated motor current load.

Previously electromagnetic brakes such as the one shown in the drawing have been fabricated from flame-cut steel boiler plate sections welded together. In one standard size brake, our number A102, the drop-out time was approximately 112 milliseconds. In fabricating this brake from steel it was diffcult to get the brake to pickup at less than 40% of rate motor current.

A direct current electromagnetic brake such as the one illustrated in the drawing was fabricated from ferritic ductile iron castings. The two side frames 11 and 12, the electromagnet 32, and the armature 31 are all of ferritic ductile iron castings. The brake was the same standard size, our nummer A102. The drop-out time was 48 milliseconds and the brake also picked up at 31.8% of rated motor current. The difference between the two A102 brakes was unexpected as the magnetization curves indicated that the magnetization of ductile iron was much lower than that of steel.

The ferritic ductile iron castings used has a microstructure with a matrix of ferrite and small amounts of fine pearlite. The pearlite should not exceed 10% as the iron carbides in the pearlite tend to reduce the build-up of magnetic flux in the base ductile iron. The iron carbides in ductile iron are usually broken down by fully annealing the ductile iron castings.

In summary a new and improved electromagnetic brake has been invented. Such an electromagnetic brake has its structural pieces fabricated from ferritic ductile iron castings with less than 10% pearlite structure.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. An electromagnetic brake comprising, a rotatable drum, a pair of brake shoes therefor, an electromagnet having a floating armature, an operating linkage interconnecting said brake shoes including said armature connected to one of said shoes for clamping the drum between the shoes upon movement of said armature to engage the one shoe with said drum, means to control the movement of both shoes out of engagement with the drum upon opposite movement of said armature, and structural members supporting said brake shoes fabricated from ferritic ductile iron with less than 10% pearlite structure.

2. An electromagnetic brake comprising, a rotatable drum, a pair of brake shoes therefor, an electromagnet having a floating armature fabricated from ferritic ductile iron with less than 10% pearlite structure, an operating linkage interconnecting said brake shoes including said armature connected to one of said shoes for clamping the drum between the shoes upon movement of said armature to engage the one shoe with said drum, means to control the movement of both shoes out of engagement with the drum upon opposite movement of said armature, and structural members supporting said brake shoes fabricated from ferritic ductile iron with less than 10% pearlite structure.

References Cited

UNITED STATES PATENTS 2,830,682  4/1950  Noon _____ 188—171

OTHER REFERENCES

Metals Handbook, vol. 1, Properties and Selection of Metals, 8th edition, American Society for Metals, pages 785–790.

DUANE A. REGER, *Primary Examiner.*